SEARCH ROOM

Jan. 21, 1958 H. E. OVERACKER 2,820,889

AUTOMATIC RADIO JAMMING SYSTEM

Filed Feb. 26, 1953 2 Sheets-Sheet 1

*INVENTOR.*
HORACE E. OVERACKER
*BY*
Harry M. Saragovitz
Attorney

INVENTOR.
HORACE E. OVERACKER
BY Harry M. Saragovitz
Attorney 2,820,889
Patented Jan. 21, 1958

2,820,889

AUTOMATIC RADIO JAMMING SYSTEM

Horace E. Overacker, Los Altos, Calif., assignor to the United States of America as represented by the Secretary of War Application February 26, 1953, Serial No. 339,023

6 Claims. (Cl. 250—13)

The invention described herein may be manufactured and used by or for the Government for governmental purposes without the payment to me of any royalty thereon.

This is a continuation in part of my application, Serial No. 648,535, filed February 18, 1946, now abandoned.

This invention relates to transmitter-receiver systems and more particularly to a system for searching for signals in a given band and for transmitting signals at the frequency of the received signals.

According to certain military practices, interference may be created by friendly stations to disrupt operation or cause failure of radio apparatus employed by the enemy. Such interference is commonly referred to as jamming. Jamming may be carried out against voice or code transmissions or against radar or similar electronic systems. The jamming is normally accomplished by transmitting a signal at the frequency on which the enemy apparatus operates. The jamming signal may be a continuous wave or it may be a wave modulated in some respect, such as in amplitude, phase, or frequency. The frequency of the transmission may be controlled manually or automatically in accordance with information obtained from an associated search receiver.

It is an object of the present invention, therefore, to provide an improved apparatus for controlling the frequency of transmission from a transmitter in accordance with the output from an associated search receiver.

It is a further object of the present invention to provide an improved apparatus for searching a predetermined band of frequencies and for automatically transmitting signals at the frequency of the received signals for a predetermined time and then continuing the search.

It is a further object of the invention to provide an apparatus for automatically tuning a receiver through a band of frequencies, tuning a transmitter through the same band of frequencies, stopping the receiver tuning at the frequency of a first signal received by the receiver and then stopping the transmitter tuning at the frequency of a second signal received by the receiver.

For a better understanding of the invention, together with other and further objects thereof, reference is had to the following description taken in connection with the accompanying drawings of which:

Figure 1:
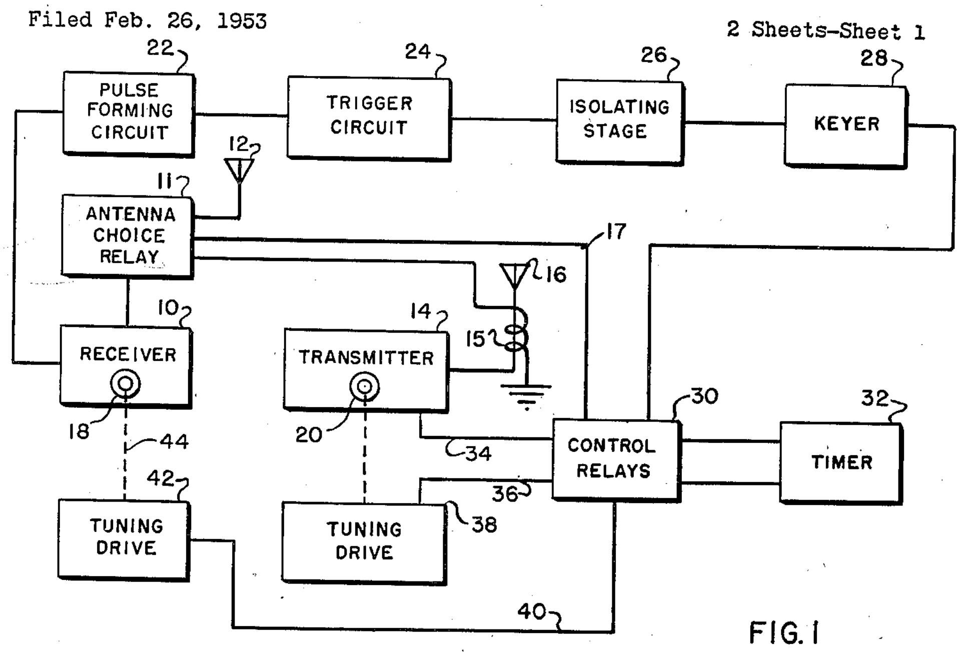
Figure 1 is a block diagram of the preferred embodiment of the present invention.

Referring now to Figure 1, the preferred embodiment includes a receiver 10 connected through a relay 11 to an antenna 12 and a transmitter 14 connected to a transmitting antenna 16. The receiver 10 may be a type, well known in the art, capable of searching for signals within predetermined frequency limits. The frequency of reception of receiver 10 is preferably controlled by a single tuning knob 18. The antenna 12 is suitably designed for use at the frequencies on which the receiver 10 operates, and is preferably of the non-directional type. Under certain conditions, which will be explained below, it is desirable to disconnect the receiving antenna 12 from the receiver and connect the receiver to transmitter pick-up loop 15 located adjacent the transmitter antenna 16. This is accomplished by antenna choice relay 11 which is energized from control relays 30. The loop 15 may include means for adjusting the degree of coupling between the loop and antenna 16. The transmitter 14 may be any type of transmitter which is tunable over a band of frequencies between predetermined limits which are preferably the same as the reception frequency limits of the receiver 10. The antenna 16 may be any suitable antenna adapted for use at the frequency of operation of the transmitter 14, and is also preferably of the non-directional type. The frequency of transmission from the transmitter 14 may be controllable by a single tuning knob 20.

The output of the receiver 10 is electrically connected to a pulse-forming circuit 22 adapted to produce a short pulse from an input signal. For example, the pulse-forming circuit 22 may comprise a short time constant RC or RL combination, or it may comprise a vacuum tube circuit capable of producing an output pulse when the input to the circuit is changed substantially. Another circuit arrangement which might be employed to obtain the required activating signal for application to the trigger circuit 24 would be to utilize in the pulse forming circuit 22 a low pass filter to reduce all signals to substantially the same frequency level and to use the output thereof to control the trigger circuit 24. The output of the pulse-forming circuit is connected to a trigger circuit 24 adapted to generate a relatively long rectangular voltage gate upon reception of an initiating pulse. For example, the trigger circuit 24 may be any of the well known types of one-shot, flip-flop or delay multivibrators. The output of the trigger circuit 24 is electrically connected to an isolating stage 26 which may be an amplifier, a cathode follower, or other suitable circuit, and thence to a keyer 28.

The keyer 28 may be any type of circuit well known in the art capable of operating one or more mechanical or electrical relays when the keyer is properly energized. For example, the keyer 28 may include a vacuum tube which is maintained in a non-conducting state except during the time of incidence of a rectangular voltage from the isolating stage 26. The plate or cathode load of the keyer 28 will normally be the coil or coils of one or more relays.

The output of the keyer 28 is connected to a series of control relays indicated generally by the block 30. The function of the control relays 30 will become more evident from the discussion to follow. There are many combinations of relays which can perform the desired operations equally well. Connections are made from the control relays 30 to a timer 32 which may be either electronic or mechanical in nature. Connection 34 is made from the control relays 30 to the transmitter 14. The purpose of the connection 34 and associated circuits is to turn the transmitter 14 off and on at the proper times. Connection 36 is made from the control relays 30 to a tuning drive 38 which is mechanically connected to the dial 20 of transmitter 14. Tuning drive 38 may consist of a motor, and a clutch for coupling the motor to the tuning control 20. If desired, the motor and clutch may be activated separately as in the embodiment illustrated in Fig. 2. The tuning drive 38, when energized, causes the frequency of transmission from the transmitter 14 to vary cyclically over a predetermined band of frequencies. The variation may be at a uniform speed in both directions or it may be from a low frequency to a high frequency with a quick return to the low frequency and then a repeat of the cycle. The tuning drive 38 may comprise a motor adapted to rotate in one direction only and having appropriate magnetic clutches for engaging the tuning dial 20 in such a manner that the frequency band is cyclically covered; or the tuning drive 38 may comprise a motor the direction of rotation of which is automatically changed when the tuning dial 20 has reached certain predetermined limits. The connection 36 from the control relays 30 to the tuning drive 38 is for the purpose of energizing and deenergizing the tuning drive 38. Connection 40 is made from the control relays 30 to a tuning drive 42 which is similar in structure and operation to the tuning drive 38 but which is for the purpose of changing the tuning of the receiver 10 through the mechanical connection indicated by the dashed line 44.

The apparatus illustrated in Fig. 1 operates as follows: When the apparatus is first turned on, the position of the control relays 30 are such that the tuning drive 42 is energized and the reception frequency of receiver 10 is cyclically varied between predetermined frequency limits. Upon reception of a signal by the receiver 10, the pulse-forming circuit 22 and the trigger circuit 24 are actuated. The trigger circuit 24 produces a substantially rectangular voltage pulse of relatively long duration which is coupled through the isolating stage 26 to the keyer 28. Keyer 28 correspondingly produces a control signal which actuates control relays 30. The control relays 30 then stop the movement of the tuning drive 42, turn transmitter 34 on, and actuate its tuning drive 38. Also, energy is supplied over line 17 to antenna choice relay 11 which disconnects antenna 12 from the receiver and connects transmitter pick-up loop 15 to the receiver. Initiated by reception of a signal by receiver 10, then, the frequency of transmission from the transmitter 14 varies cyclically through the predetermined frequency band. When the signal frequency of transmitter 14 becomes identical with the frequency to which the receiver 10 is tuned, a second signal is picked up by loop 15 and supplied to the receiver 10. This second signal similarly actuates keyer 28 through the stages 22, 24, and 26. The second control signal from keyer 28 causes control relays 30 to stop the tuning drive 38. The timer 32 may be caused to be actuated by either the first control signal or the second control signal, depending upon the relay arrangement employed. The control relays 39 may also be designed to perform additional functions if desired, such as desensitizing the receiver 10 during the time that transmitter 14 is on, changing the type of transmission from unmodulated continuous wave signals to noise modulated signals when the tuning drive 38 stops the transmitter on frequency, etc. The timer 32 is adapted to determine a time interval (measured from the instant at which it is turned on), such as 15 seconds, after which time it returns a signal to the control relays 30 which turns off the transmitter 14 and again starts the tuning drive 42. As mentioned above, this time interval may start at the time the first signal is received by the receiver or it may start at the instant the transmitter stops on frequency. In both these cases when the interval ends, the transmitter is turned off in the manner described. The functioning of timer 32 and the control relays 30 may be modified, if desired, in such a manner that no actuating signal is sent to the tuning drive 42 immediately after transmission from transmitter 14. In this case, if a signal is still being received by the receiver 10, the transmitter will again be turned on and the jamming cycle described above repeated. Thus signals will be transmitted intermittently at the frequency of the received signal so long as the received signal persists. When there is no received signal, the tuning drive 42 is again actuated after a short delay which may be controlled by the timer 32 and the receiver 10 continues to sweep until such time as another signal is intercepted.

By means of switches or by suitable design of the control relays 30, the apparatus illustrated in Fig. 1 may be caused to operate in any one of several different ways. For example, it is possible to permit manual operation of both the receiver and the transmitter or to permit manual operation of the receiver with automatic operation of the transmitter, or, as heretofore described, automatic operation of both the transmitter and receiver. When the apparatus is intended for automatic operation, the switches and relay circuits may be suitably designed to vary the sequence of operation. For example, it is possible for the receiver to relock on the same signal without sweeping, or the transmitter to relock on the receiver frequency without sweeping, or the transmitter to leave the receiver frequency and resweep before locking, or the receiver to leave the original signal and lock on the next signal encountered in the selected sweep band.

Figure 2:
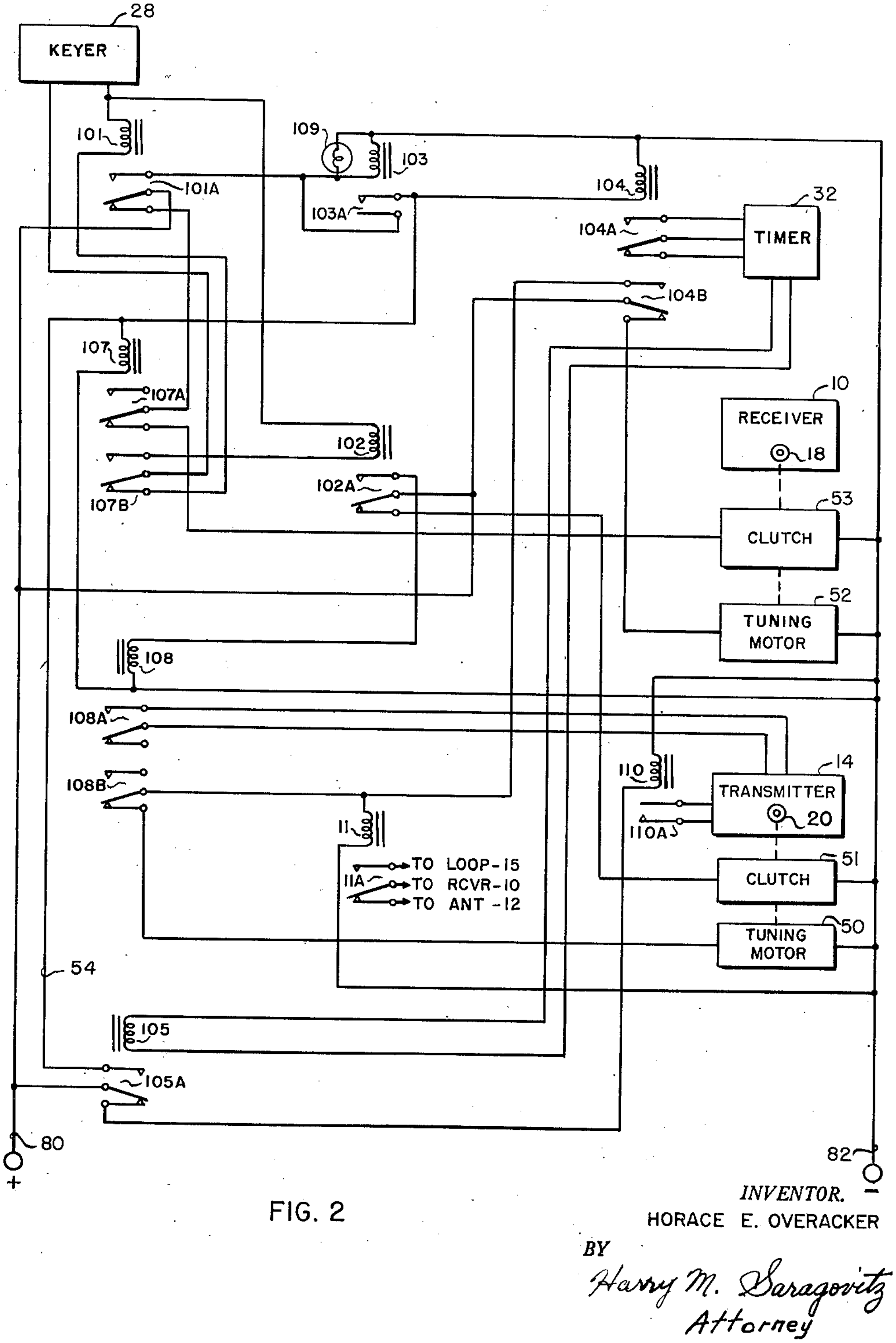
Figure 2 is a schematic diagram of the control relay system of the invention.

Fig. 2 illustrates one embodiment of a relay arrangement which may be used to accomplish the functions outlined above. The relay contacts are shown in each case directly below the operating magnet with which they are associated. In the relaxed position of the various relays the center and lower contacts of the relays are closed and in the energized position the center and upper contacts of the relays are closed. It is understood that relays designed for A.-C. or D.-C. operation at any suitable voltage may be used.

Prior to an output control signal from keyer 28, the following initial circuit conditions prevail:

The receiver and the transmitter filaments are turned on. All relay contacts are in their relaxed positions, except for relay contacts 110A. As will be explained further below, relay 110 is energized prior to the output of a control signal from keyer 28. This opens contacts 110A.

The receiver tuning motor 52 is energized by voltage fed through the relaxed position of contacts 104B from a power supply connected to busses 80 and 82.

The receiver tuning drive magnetic clutch 53 is energized by voltage fed through the relaxed position of contacts 101A and 107A. (Clutch 53 and motor 52 comprise tuning drive 42 of Fig. 1.) Thus the tuning control 18 of receiver 10 is engaged with the receiver tuning drive motor and the receiver is scanned periodically over a given frequency band.

Relay 101 is connected through the relaxed position of contacts 107B to the output of keyer 28 and is, therefore, in position to be energized by an output control signal from the keyer 28. Voltage is supplied through the relaxed position of contacts 102A to the transmitter tuning drive magnetic clutch 51. The transmitter motor 50 (which is not at this time energized) is thereby mechanically coupled to the transmitter tuning control 20. (Clutch 51 and motor 50 comprise tuning drive 38 of Fig. 1.) Transmitter plate voltage relay 110 is maintained energized through the relaxed position of contacts 105A and high voltage is prevented from being applied to the transmitter. Upon the reception of a first signal by the receiver 10, keyer 28 supplies a signal to relay 101 and the following relay sequence occurs:

Relay 101 is actuated, removing the voltage formerly supplied through the relaxed position of contacts 101A to the clutch 53 and the receiver is therefore stopped at the frequency of the received signal. In the circuit actually used, the trigger circuit 24 was caused to operate slightly before the zero beat position. So, in order to allow more time to bring the receiver to exact frequency, a time constant circuit was incorporated in the keyer. The time constant of this circuit and the mechanical inertia of the relays and magnetic clutch was sufficient to accurately stop the tuning on frequency. Other circuits well known in the art could also be used to accomplish the same result, that is, to compensate for any mechanical or electrical inertia which would tend to impair the accuracy of the receiver setting.

Voltage is supplied through the energized position of contacts 101A to relay 103. However, due to the lamp 109 in parallel with the relay coil, there is a short time delay before relay 103 operates. This delay is caused by the large change in resistance of the lamp 109 as it changes from the cold to the incandescent condition. In practice, the time delay was found to be roughly 1/10 of a second. The purpose of the delay is to prevent momentary surges which might actuate relay 101 from actuating relay 103.

After the 1/10 second delay, relays 104 and 107 are actuated through contacts 101A and 103A. The circuit of the receiver tuning drive motor is opened through contacts 104B. The transmitter tuning drive motor circuit is closed through contacts 104B and the relaxed position of contacts 108B and since the clutch 51 is already engaged, the motor starts tuning the transmitter over the predetermined frequency band for which the drive unit is set. The antenna choice relay 11 is actuated through the energized position of contacts 104B. This disconnects the receiver antenna 12 from the receiver and connects the transmitter pickup loop 15 to the receiver.

The timer 32 is actuated through the energized position of contacts 104A. Upon actuation of the timer, relay 105 is energized. Relay 107, which operated simultaneously with relay 104, disconnects relay 101 from across the output of the keyer and connects relay 102 across the output of the keyer, both of the above functions being accomplished through contacts 107B. Relay 102 is thus placed in position to be energized by a second control signal output of keyer 28. The receiver tuning drive magnetic clutch circuit is opened at a second point by contacts 107A, preventing movement of the receiver tuning while relay 107 remains energized.

When relay 105 is energized, the circuit to relay 110 is opened. This closes contacts 110A in the transmitter high voltage circuit and the transmitter begins transmitting unmodulated continuous wave signals. The transmitter changes to noise modulated transmission later. A holding voltage is applied through the energized position of contacts 105A to relays 107 and 104 through line 54. This is to prevent relays 104 and 107 from dropping out due to the deenergization of relay 101. As a result of the above steps, the transmitter drive unit sweeps the transmitter over its scanning range. As the frequency at which the receiver is stopped is approached, the unmodulated continuous wave signal from the transmitter, which is picked up by the transmitter pickup loop, is fed through the receiver and causes keyer 28 to produce a second output control signal.

The following relay sequence then results:

Relay 102 is energized. The transmitter tuning drive magnetic sweep circuit is opened, thereby stopping the transmitter on frequency. Here again, as described in connection with the stopping of the receiver drive, circuits may be included to compensate for mechanical and electrical time lags and to cause the transmitter accurately to stop at the desired frequency. Since many such circuits are well known in the art and the inventive concept claimed herein does not lie in these circuits, they will not be described further.

Relay 102 operates relay 108 through the energized position of contacts 102A. The noise modulation control of the transmitter (not shown) located within the transmitter is closed through the energized position of contacts 108A. This places noise modulation on the carrier of the transmitter. This jamming transmission continues for the interval determined by the adjustment of the timer 32.

The jamming interval is determined by timer 32, which, in turn, controls the drop out of relay 105. Contacts 108B open the circuit of the transmitter tuning drive motor. At the completion of the timing interval, relay circuit 105 is opened, relay 110 is energized and the transmitter high voltage circuit is opened.

The holding voltage is removed from relays 104 and 107 and these relays are dropped out. Relay 104, in dropping out, deenergizes relay 111 and the receiver is therefore reconnected to receiver antenna 12. The receiver tuning drive motor is again actuated through contacts 104B and the timer 32 is open circuited through contacts 104A. The tuning drive magnetic clutch is again actuated through contacts 101A and 107A. As the tuning drive motor and tuning drive magnetic clutch circuits are now both closed, the receiver is again caused to scan its predetermined frequency band. If desired, a short time delay circuit may be incorporated to maintain the receiver on frequency momentarily before the receiver scanning starts. In this case, if an enemy signal is still being received at the original frequency, the receiver will pick up the signal, the keyer will again provide a first control signal to relay 101 and the entire jamming cycle, described above, will be repeated. Relay 102 is open circuited and relay 101 is again connected across the keyer 28 output through contacts 107B. Relay 102, in dropping out, deenergizes relay 108.

Figure 3:
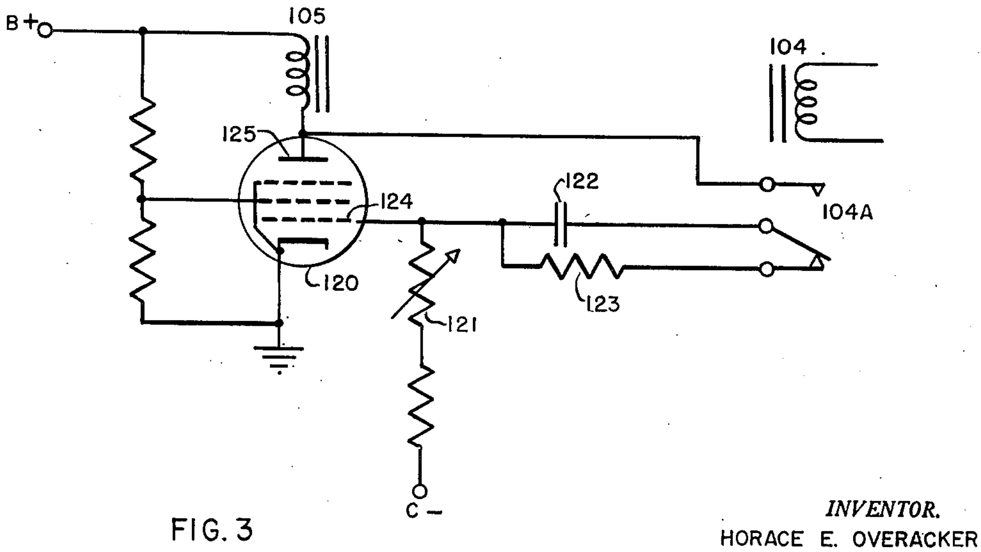
Figure 3 is a schematic diagram of a component of the invention.

Going now to Fig. 3, there is shown one type of electronic timer circuit which can be used in timer 32. It consists of pentode tube 120 having a control grid 124 and anode 125. Anode voltage is supplied to tube 120 through relay 105, the contacts of which are not shown in Fig. 3. Pentode 120 is normally biased to cutoff by a negative voltage supplied to the control grid 124 through potentiometer 121. In practice, a negative voltage of —4 volts was sufficient to cut the tube off. In the plate to grid circuit of pentode 120 is a capacitor 122 and relay contacts 104A of relay 104. A resistor 123 shunts capacitor 122 in the relaxed position of contacts 104A.

The electric timer operates as follows: Capacitor 122 is normally shunted by resistance 123 through the relaxed position of contacts 104A. Resistor 123 is of a relatively low value, its purpose being to discharge capacitor 122. When relay 104 is energized, capacitor 122 connects the anode 125 of pentode 120 to its control grid 124. Capacitor 122 now gradually charges, due to the voltages across it in series with potentiometer 121. In view of the initial high voltage drop across potentiometer 121, pentode 120 almost instantaneously begins to conduct and relay 105 is energized. As time goes on, condenser 122 becomes more charged and the voltage drop across potentiometer 121 decreases due to the smaller amount of current through it until eventually the cutoff potential of pentode 120 is reached. When tube 120 is again cut off, the current ceases to flow through relay 105 and contacts 105A (Fig. 2) are opened, removing the holding voltage from relay 104, terminating the timing sequence in the manner described in connection with Fig. 2. When relay 104 drops out, resistor 123 is shunted across capacitor 122 and the latter rapidly discharges through the resistor placing the electronic timer circuit in condition again to be actuated. The time interval measured by the electronic timer is largely determined by the values of potentiometer 121 and capacitor 122. In the circuit used, the potentiometer had the maximum resistance of 5 megohms and the capacitor a value of 4 microfarads.

While there has been described what is, at present, considered to be a preferred embodiment of the invention, it will be obvious to those skilled in the art that various modifications may be made therein without departing from the invention.

What is claimed is:

1. A jamming system comprising a receiver for receiving radiated waves, normally operative receiver tuning drive means for continuously tuning only said receiver over a predetermined frequency band, a normally inoperative transmitter for transmitting a jamming signal wave, normally inoperative transmitter tuning drive means for continuously tuning only said transmitter over said predetermined frequency band, means responsive to a first wave received by said receiver for deriving therefrom a first control signal, means responsive to said first control signal for simultaneously stopping said receiver tuning drive means at the frequency of said first wave, rendering operative said transmitter, and actuating said transmitter tuning drive means, a holding relay responsive to said first control signal to maintain said transmitter operative and to maintain said transmitter tuning drive means actuated when said first signal is terminated, means responsive to a second wave received by said receiver from said transmitter when the latter is tuned to the response frequency of said receiver for deriving therefrom a second control signal, and means responsive to said second control signal for stopping said transmitter tuning drive means, and a time delay means actuated by said first control signal for disabling said holding relay, thereby terminating the operation of said transmitter and again actuating said receiver tuning drive means, a predetermined time interval after the occurrence of said second control signal.

2. A jamming system as set forth in claim 1, wherein said transmitter comprises a normally inoperative noise modulating means, and means responsive to said second control signal for rendering said modulating means operative.

3. A jamming system as set forth in claim 1, wherein said means for deriving said first control signal, comprises means responsive to a received wave for delivering an output having a uniform amplitude and duration regardless of the modulation characteristic of said received wave.

4. A jamming system as set forth in claim 3, wherein the last named means comprises a one-shot multivibrator.

5. In combination, a source of carrier frequency oscillations, normally ineffective means for modulating said oscillations, sweep-tuning means for tuning said source over a band of frequencies, and tunable frequency controlling means coupled to said source and responsive to the oscillations thereof for disabling said sweep-tuning means when said oscillations are tuned to a frequency dependent upon the frequency to which said controlling means is tuned and to render said modulating means effective.

6. In combination, a normally inactive transmitter, a normally inactive modulating means for said transmitter, a receiver, said transmitter and receiver being tunable over the same frequency band, sweep-tuning means for sweeping the tuning of said receiver over said band, a first control means responsive to reception of a radiated signal by said receiver to stop said sweep-tuning means, whereby said receiver remains tuned to said radiated signal, means operated by said first control means to activate said transmitter and cause the tuning thereof to be varied, and a second control means operable by the output of said receiver in response to reception of a signal from said transmitter to maintain said transmitter tuned to the same frequency as said receiver and to activate said modulating means.

References Cited in the file of this patent

UNITED STATES PATENTS

| | | |
|---|---|---|
| 2,295,629 | Bond | Sept. 15, 1942 |
| 2,412,991 | Labin | Dec. 24, 1946 |
| 2,418,139 | Preisman | Apr. 1, 1947 |
| 2,532,589 | Wu | Dec. 5, 1950 |
| 2,567,261 | Williams | Sept. 11, 1951 |
| 2,617,985 | Collins | Nov. 11, 1952 |
| 2,640,150 | Wu | May 26, 1953 |